US012360992B2

(12) United States Patent
Sweeney et al.

(10) Patent No.: US 12,360,992 B2
(45) Date of Patent: Jul. 15, 2025

(54) MACHINE LEARNING FOR LOCATING INFORMATION IN KNOWLEDGE GRAPHS

(71) Applicant: Capital One Services, LLC, McLean, VA (US)

(72) Inventors: Mackenzie Sweeney, McLean, VA (US); Christopher Bruss, McLean, VA (US); Antonia Gogoglou, McLean, VA (US)

(73) Assignee: Capital One Services, LLC, McLean, VA (US)

( * ) Notice: Subject to any disclaimer, the term of this patent is extended or adjusted under 35 U.S.C. 154(b) by 1130 days.

(21) Appl. No.: 17/227,523

(22) Filed: Apr. 12, 2021

(65) Prior Publication Data

US 2022/0327124 A1    Oct. 13, 2022

(51) Int. Cl.
*G06F 16/2452*    (2019.01)
*G06N 5/02*    (2023.01)
*G06N 5/04*    (2023.01)
*G06N 20/00*    (2019.01)

(52) U.S. Cl.
CPC ......... *G06F 16/24526* (2019.01); *G06N 5/02* (2013.01); *G06N 5/04* (2013.01); *G06N 20/00* (2019.01)

(58) Field of Classification Search
CPC .... G06F 16/24526; G06N 20/00; G06N 5/02; G06N 5/04
See application file for complete search history.

(56) References Cited

U.S. PATENT DOCUMENTS

10,769,426 B2    9/2020    Guo et al.
10,860,936 B2    12/2020    Lindsley

*Primary Examiner* — Casey R. Garner
(74) *Attorney, Agent, or Firm* — Foley & Lardner LLP (57) ABSTRACT

Methods and systems are for using machine learning models to locate information in an organizational graph. A search system may use techniques described herein to determine relevant data (e.g., organizational knowledge) to retrieve from a knowledge graph for input to a machine learning model. The search system may retrieve more relevant data from the knowledge graph through the use of time data that may enable the search system to avoid outdated information. The search system may also limit the data that may be used in determining an answer to a query. By doing so, the search system may be able to answer queries more efficiently (e.g., using less computing resources, less processing power, etc.).

18 Claims, 7 Drawing Sheets

| Node ID | Node Type | Parameter 1 | Parameter 2 | Parameter 3 | Connections |
|---|---|---|---|---|---|
| 321 | Software Code Repository | Programming language | Date Created | Number of Users | 322, 327, 323 |
| 322 | Meeting | Date/Time | Location | Topic | 321, 339, 343 |
| 323 | Person | Name | Occupation | Start Date | 345, 346, 321 |
| 324 | Project | Date started | Status | Features | 356, 357 |

MACHINE LEARNING FOR LOCATING INFORMATION IN KNOWLEDGE GRAPHS

BACKGROUND

Organizations may store a great deal of data about themselves. For example, organization may host data stores that store information about employees that work in the organization, employee email data, meeting data, software code for any software products they may develop, and/or many other kinds of data. When users search for specific data about a subject (e.g., a document, knowledgeable employee, or other data about a subject) within an organization it may be difficult or impossible to find the correct data that a user is searching for because there are too many different data sources to search. Some of those data sources may be of different formats and types making searching even more difficult. Moreover, it may be difficult for a computing system to process the vast quantity of data when faced with a search request. Even if some information is found, it can be stale and out of date because various updates have occurred in the organization.

SUMMARY

Methods and systems are described herein for using knowledge graphs (e.g., organizational graphs, heterogeneous graphs, etc.) to find up to date information in an organizational setting or another suitable setting.

Organizations may host many information sources in different formats. For example, an organization may store emails, meeting information, software code repositories, personnel records with employee information (e.g., name, address, occupation, age, etc.), information about products (e.g., price, features, capabilities, teams that work on a product, etc.), or other information. The information in an organization can be difficult to discover, maintain, and/or update. In some cases, to alleviate the issue of searching different types of data stores, the information of the organization may be represented in one or more knowledge graphs and may be stored in a database (e.g., a graph database and/or a time series database). As more and more data is stored, it may be difficult to determine what data should be used in answering a query. For example, some information may be less relevant than other information because it is older and may no longer be accurate or as effective in providing answers to queries, predictions, or other tasks performed by a machine learning model. For example, a user submits a query requesting the identity of a person that is knowledgeable about a software code repository at an organization, it may be difficult for a search system to distinguish between multiple potential answers to the query. For example, a first employee may have worked on the repository for two years while a second employee may have worked on the repository for only six months. However, five years may have transpired since the first employee worked on the repository, in contrast to the second employee who may have worked on the repository more recently. In this example, providing contact information for the second employee may be more helpful than providing contact information for the first employee. Details described herein may allow a search system to better address these issues and provide more relevant responses to queries.

Additionally or alternatively, excessive amounts of data may slow down a computer's ability to retrieve the answer to a query. In addition, organizational knowledge can be very helpful to product development, collaboration, or achieving other goals of the organization. Organizational knowledge can help to identify products to build that solve customer needs. Organizations can be vast and may have so much data that it can be difficult for a computing system to keep track of the data and/or perform search on the data. To address these issues, a search system may use techniques described herein to determine relevant data (e.g., organizational knowledge) to retrieve from a knowledge graph for input to a machine learning model. The search system may retrieve more relevant data from the knowledge graph through the use of time data that may enable the search system to avoid outdated information. The search system may also limit the data that may be used in determining an answer to a query. By doing so, the search system may be able to answer queries more efficiently (e.g., using less computing resources, less processing power, etc.).

The search system may receive a query from a client device, and the query, for example, may indicate a request to identify an information source in an organization. The organization may be represented in a graph and may include a plurality of nodes connected by a plurality of edges. The nodes and edges may indicate various associations between entities in the organization. An edge may be associated with a timestamp that indicates a time that the association between two nodes was formed or modified. For example, an edge between a software code repository node and a person node may include a timestamp indicating a time that the person last modified the software code repository. The search system may identify a first node in the knowledge graph corresponding to the query and may determine edges connecting the first node with a set of other nodes. The search system may retrieve timestamps corresponding to the edges and inclusion in the set of nodes may be limited by the timestamps. For example, if a time indicated by the timestamp is not within a threshold time period, the corresponding node may be excluded from the set of nodes.

The search system may retrieve, from the set of nodes, node parameters. The node parameters may include data corresponding to the entity that a node represents. For example, if a node represents a meeting, the parameters may include a location, topic, and data/time of the meeting. In another example, if a node represents a person, the parameters may include a name, address, employee title, and/or other suitable parameters. In yet another example, if a node represents a document, the parameters may include authors of that document, creation time, topic, and/or other suitable parameters. The node parameters may be used to generate a vector representation for the set of nodes and the vector representation may be used as input into a machine learning model, which may output additional parameters. The output parameters may be used to identify information sources that are responsive to the query. For example, the output parameters may be compared with nodes in the graph to find a node that may be responsive to the query.

Various other aspects, features, and advantages of the invention will be apparent through the detailed description of the invention and the drawings attached hereto. It is also to be understood that both the foregoing general description and the following detailed description are examples and not restrictive of the scope of the invention. As used in the specification and in the claims, the singular forms of "a." "an." and "the" include plural referents unless the context clearly dictates otherwise. In addition, as used in the specification and the claims, the term "or" means "and/or" unless the context clearly dictates otherwise. Additionally, as used in the specification "a portion." refers to a part of, or the entirety of (i.e., the entire portion), a given item (e.g., data) unless the context clearly dictates otherwise.

DETAILED DESCRIPTION OF THE DRAWINGS

In the following description, for the purposes of explanation, numerous specific details are set forth in order to provide a thorough understanding of the disclosure. It will be appreciated, however, by those having skill in the art, that the disclosure may be practiced without these specific details or with an equivalent arrangement. In other cases, well-known structures and devices are shown in block diagram form to avoid unnecessarily obscuring the disclosure.

Figure 1:
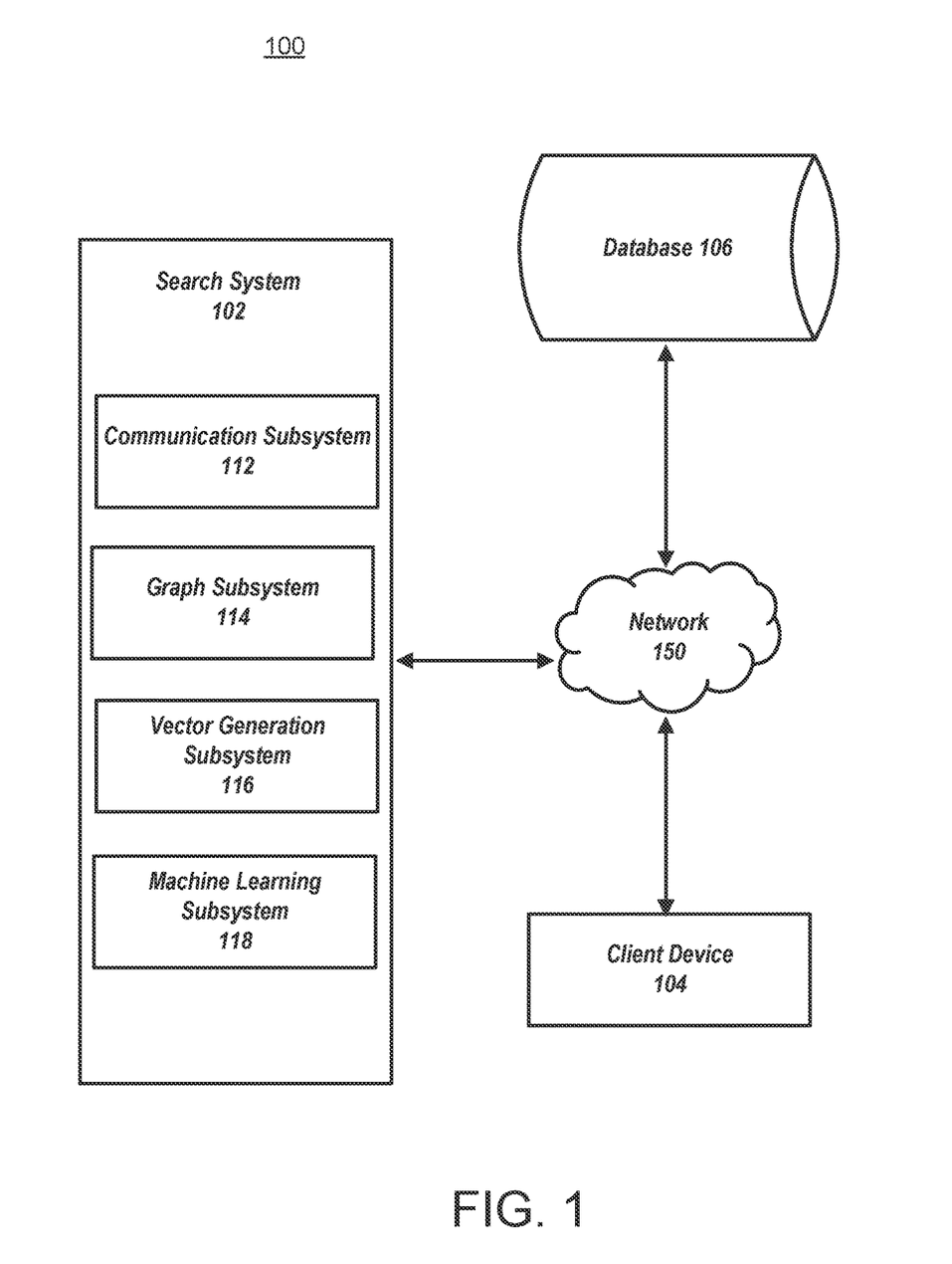
FIG. 1 shows an example search system for locating information sources in response to a query, in accordance with some embodiments.

FIG. 1 shows an example computing system 100 for locating information sources in response to a query. For example, the system 100 may be used to locate information sources responsive to a query and/or to recommend entities, features, team members, or other components to use in projects in an organization. The system 100 may include an search system 102, a database 106, and a client device 104.

The client device 104 may be any computing device, including, but not limited to, a laptop computer, a tablet computer, a hand-held computer, smartphone, other computer equipment (e.g., a server or virtual server), including "smart," wireless, wearable, and/or mobile devices. The client device may be used to submit a query or a request for information to the search system 102. Although only one client device 104 is shown, the system 100 may include any number of client devices, which may be configured to communicate with the search system 102 via the network 150 (e.g., to send queries/requests, or other communications).

The database 106 may include a database server, a time series database, and/or a graph database. The graph database may include one or more nodes that are representative of entities, documents, resources, or any other aspect of an organization. An edge connecting two nodes in the graph may indicate a relationship, an event, or any other association between the two nodes. The graph may be a knowledge graph, a heterogeneous graph (e.g., a graph with more than one type of node), and/or any other graph. Timestamps may be stored (e.g., in the time series database and/or the graph database) and may indicate a date/time that a relationship or association started between two nodes, and/or a date/time that an event occurred involving whatever is represented by the two nodes. The database 106 and graph are explained in more detail below, for example, in connection with FIGS. 2-7.

The search system 102 may be configured to receive a query (e.g., from the client device 104) and respond to the query with information determined through the use of one or more machine learning models (as described in more detail below). The search system 102 may be one or more computing devices described above and/or may include any type of mobile terminal, fixed terminal, or other device. For example, the search system 102 may be implemented as a cloud computing system and may feature one or more component devices. It should also be noted that system 100 is not limited to the devices shown. Users may, for example, utilize one or more other devices to interact with devices, one or more servers, or other components of system 100. It should be noted that, while one or more operations are described herein as being performed by particular components of the system 100, those operations may, in some embodiments, be performed by other components of the system 100. As an example, while one or more operations are described herein as being performed by components of the search system 102, those operations may be performed by components of the client device 104, and/or database 106. In some embodiments, the various computers and systems described herein may include one or more computing devices that are programmed to perform the described functions. Additionally or alternatively, multiple users may interact with system 100 and/or one or more components of system 100. For example, a first user and a second user may interact with the search system 102 using two different client devices.

One or more components of the client device 104, the database 106, and/or the search system 102, may receive content and/or data via input/output (hereinafter "I/O") paths. The one or more components of the search system 102, the database 106, and/or the client device 104 may include processors and/or control circuitry to send and receive commands, requests, and other suitable data using the I/O paths. The control circuitry may comprise any suitable processing, storage, and/or input/output circuitry. Each of these devices may include a user input interface and/or user output interface (e.g., a display) for use in receiving and displaying data. It should be noted that in some embodiments, the search system 102, the database 106, and/or the client device 104 may have neither user input interface nor displays and may instead receive and display content using another device (e.g., a dedicated display device such as a computer screen and/or a dedicated input device such as a remote control, mouse, voice input, etc.). Additionally, the devices in system 100 may run an application (or another suitable program). The application may cause the processors and/or control circuitry to perform operations related to using machine learning to locate information in an organizational graph.

Each device in the system 100 may include electronic storages. The electronic storages may include non-transitory storage media that electronically stores information. The electronic storage media of the electronic storages may include one or both of (a) system storage that is provided integrally (e.g., substantially non-removable) with servers or client devices or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM. RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

FIG. 1 also includes a network 150. The network 150 may be the Internet, a mobile phone network, a mobile voice or data network (e.g., a 5G or LTE network), a cable network, a public switched telephone network, a combination of these networks, or other types of communications networks or combinations of communications networks. The devices in FIG. 1 (e.g., the search system 102, the database 106, and/or the client device 104) may communicate via the network 150 using one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. The devices in FIG. 1 may comprise additional communication paths linking hardware, software, and/or firmware components operating together. For example, the search system 102, any component of the search system (e.g., the communication subsystem 112, the graph subsystem 114, vector generation subsystem 116, and/or the machine learning subsystem 118), the database 106, and/or the client device 104 may be implemented by one or more computing platforms operating together as the computing devices.

The search system 102 may include a communication subsystem 112. The communication subsystem 112 may allow the search system to communicate with the database 106 and/or the client device 104 via the network 150. The communication subsystem 112 may be configured to send requests for data to the database 106 and receive data in response to the requests.

The search system 102 may include a graph subsystem 114. The graph subsystem 114 may be configured to receive (e.g., from the database 106 via the communication subsystem 112) a graph or a portion of a graph that is representative of an organization associated with the system 100.

The search system 102 may receive a query to identify one or more information sources in the graph. For example, the query may include a request for information on how to use a product (e.g., a software application). The search system 102 may use a portion of the graph and/or a machine learning model to determine a source of information that is responsive to the query. For example, the search system 102 may identify a person that has knowledge about how to use the product; or documents, videos, and/or images that contain instructions on how to use the product. However, the graph may include so much information that it may be difficult to determine a response for the query within a reasonable time period (e.g., it may require too many computing resources, processing power, memory, etc.). It may also be difficult to determine which nodes are relevant to a query. Using too many nodes to answer a query may require too many processing resources and may be intractable as the organization continues to grow and more and more nodes are added to the graph. The search system (e.g., the graph subsystem 114) may solve this problem by determining a subset of nodes of the graph to use as input into a machine learning model.

Figure 2:
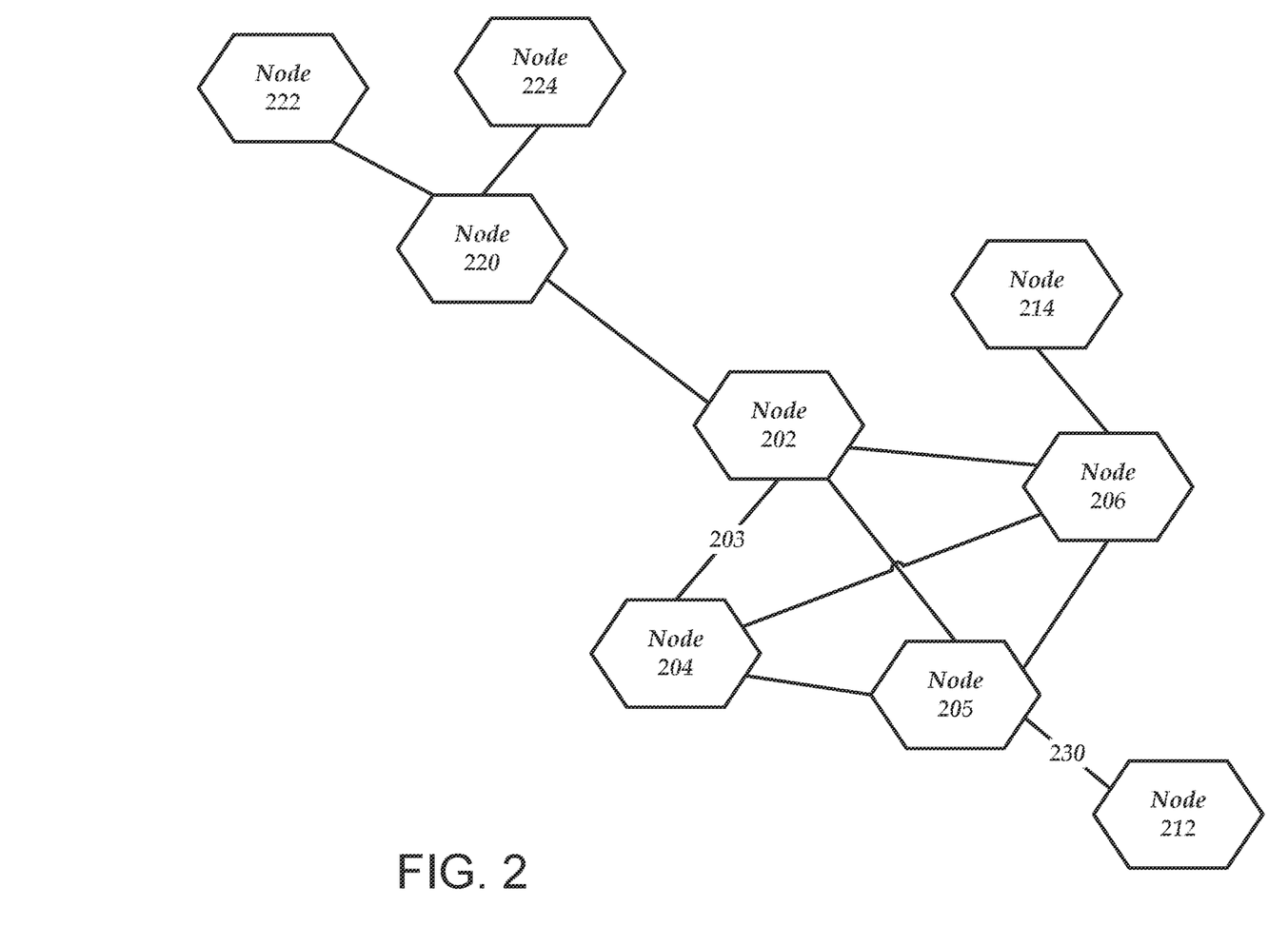
FIG. 2 shows an example knowledge graph, in accordance with some embodiments.

Referring to FIG. 2, an example graph (e.g., representing an organization) and comprising a plurality of nodes and edges is shown. A node may represent or otherwise indicate an employee, person, user, team, product, software code repository, system, dataset, document, resource, project, or any other entity/item. An edge may indicate an association between two nodes. An edge may indicate that an event that two nodes were part of. For example, two nodes representing employees of an organization may be connected via an edge because both employees attended the same meeting. For example, node 202 may be a meeting node indicating a meeting between two or more people. Node 204-206 may indicate people that attended the meeting indicated by node 202. Edges connecting each of nodes 204-206 to node 202 may indicate that each person represented by nodes 204-206 attended the meeting indicated by node 202.

Edges connecting nodes 204-206 to each other may indicate that the people represented by nodes 204-206 are on the same team. Additionally or alternatively, a team comprising the people represented by nodes 204-206 may be indicated by a team node (not shown in FIG. 2) and edges connecting nodes 204-206 to the team node may indicate that the people represented by nodes 204-206 are on the same team. An edge may be associated with a timestamp indicating a time at which the edge was created. The timestamp may indicate a time an event occurred that links together two nodes. For example, edge 203 may be associated with a timestamp indicating a date and/or time that the person indicated by node 204 attended the meeting indicated by node 202. Node 220 may indicate a project and/or product (e.g., a software product) associated with the meeting represented by node 202. For example, the meeting represented by node 202 may have been a planning meeting for features to add to the product associated with node 220. Nodes 222 and 224 may indicate teams (e.g., a software development, sales, marketing, finance, information technology support, or any other team) that are involved with the product indicated by node 220. For example, node 222 may represent a software development team responsible for creating the product indicated by node 220. As an additional example, node 212 may indicate a software code repository that the person indicated by node 205 has modified or otherwise contributed to. As another example, node 214 may indicate a document written by the person represented by node 206.

Edges and nodes may be used to represent any aspect of an organization (e.g., any system of record may provide one or more node-edge-node connections in a knowledge graph). For example, representing a variety of aspects of an organization in the knowledge graph allows a variety of queries to be answered by the search system 102. For example, if an employee of an organization has begun work on a new project, the project may not be recorded officially in any system of record. However, the new project may be inferred based on interactions between people (e.g., determined from schedule/calendar information in the knowledge graph), reporting structures (e.g., nodes/edges that represent who has applied to work at what positions at the organization, who receives what benefits (e.g., insurance, salary, etc.) at the organization, or any other relationship indicated by human resource information), software development patterns (e.g., nodes/edges that indicate changes to version control systems or other software management information), and/or information technology (IT) relationships (e.g., indicated by nodes/edges that represent incidents/errors with computer systems) indicated by the knowledge graph. For example, the new project may be inferred via a machine learning model as discussed in more detail below.

The graph subsystem 114 may determine a set of the nodes stored in the database 106 (e.g., a subset of the nodes shown in FIG. 2, or the set may include all the nodes shown in FIG. 2) that should be used in a machine learning model to determine an answer to a query. The graph subsystem 114 may identify a first node in the knowledge graph corresponding to the query. The graph subsystem 114 may determine nodes connected to the first node that may be helpful in answering the query. For example, if the query indicates a request for information on how to use a product associated with node 220, the graph subsystem 114 may identify node 220 as a starting point in the knowledge graph (e.g., the product itself). The graph subsystem 114 may determine a plurality of edges connecting the first node (in this example, the first node may be node 220) with other nodes in the knowledge graph. The other nodes may be connected to the first node via one or more other nodes and/or edges. For example, if node 220 is the first node, node 212 may be included in the set of nodes because it is connected to node 220 via other nodes/edges. The graph subsystem 114 may prevent the set of nodes from becoming too large (e.g., from including too many nodes in the set) based on one or more timestamps associated with corresponding edges in the knowledge graph. The graph subsystem 114 may retrieve a plurality of timestamps corresponding to edges and/or nodes in the knowledge graph. Each timestamp of the plurality of timestamps may be associated with a particular edge in the knowledge graph. Each timestamp may indicate a time of an interaction between an entity represented by the first node and an entity represented by a second node that is connected with the first node via one or more nodes and/or edges.

The graph subsystem 114 may limit the set of nodes to include only nodes that are connected via an edge that satisfies one or more requirements. The one or more requirements may include a time requirement. For example, the graph subsystem 114 may limit the set of nodes to nodes where corresponding edges were created within a threshold time period (e.g., 1 week, 2 months, 5 years, or any other time period indicated by the query (e.g., the time at which the query is received)). Additionally or alternatively, the set of nodes may be limited to nodes where corresponding edges are otherwise associated with a timestamp that indicates a time within the threshold time period. The graph subsystem 114 may compare a timestamp associated with an edge to the threshold time period. The graph subsystem 114 may include, in the set, a node that is connected to the edge, for example, if a time indicated by the timestamp satisfies the threshold. For example, the graph subsystem 114 may determine that a timestamp associated with edge 230 indicates a time that does not satisfy a time threshold (e.g., the time was more than 5 years ago, more than 6 months ago, was not between June 2017 and June 2018, or any other time threshold). Based on this determination, the node 212 may be excluded from the set of nodes. In some embodiments, the threshold time period may be determined automatically. For example, the interference system may use the content of the query to determine the threshold. In another example, the threshold time period may be determined based on the type of the first node that is identified based on the query. If a node corresponds to a document one threshold time period may be determined. However, if a node corresponds to a person, a different threshold time period may be determined.

Additionally or alternatively, the one or more requirements may include a relevance score. The graph subsystem 114 may limit the set of nodes to nodes that are determined to be relevant to the first node. The relevance between the first node and a second node may be determined based on how many edges are connecting the first node and the second node. For example, the relevance threshold may be two edges. With this example relevance threshold, node 202 and node 205 may be considered relevant to node 220 and may be included in a set of nodes. However, node 212 may be excluded from the set of nodes because it is separated by more than two edges from node 220.

Figure 3:
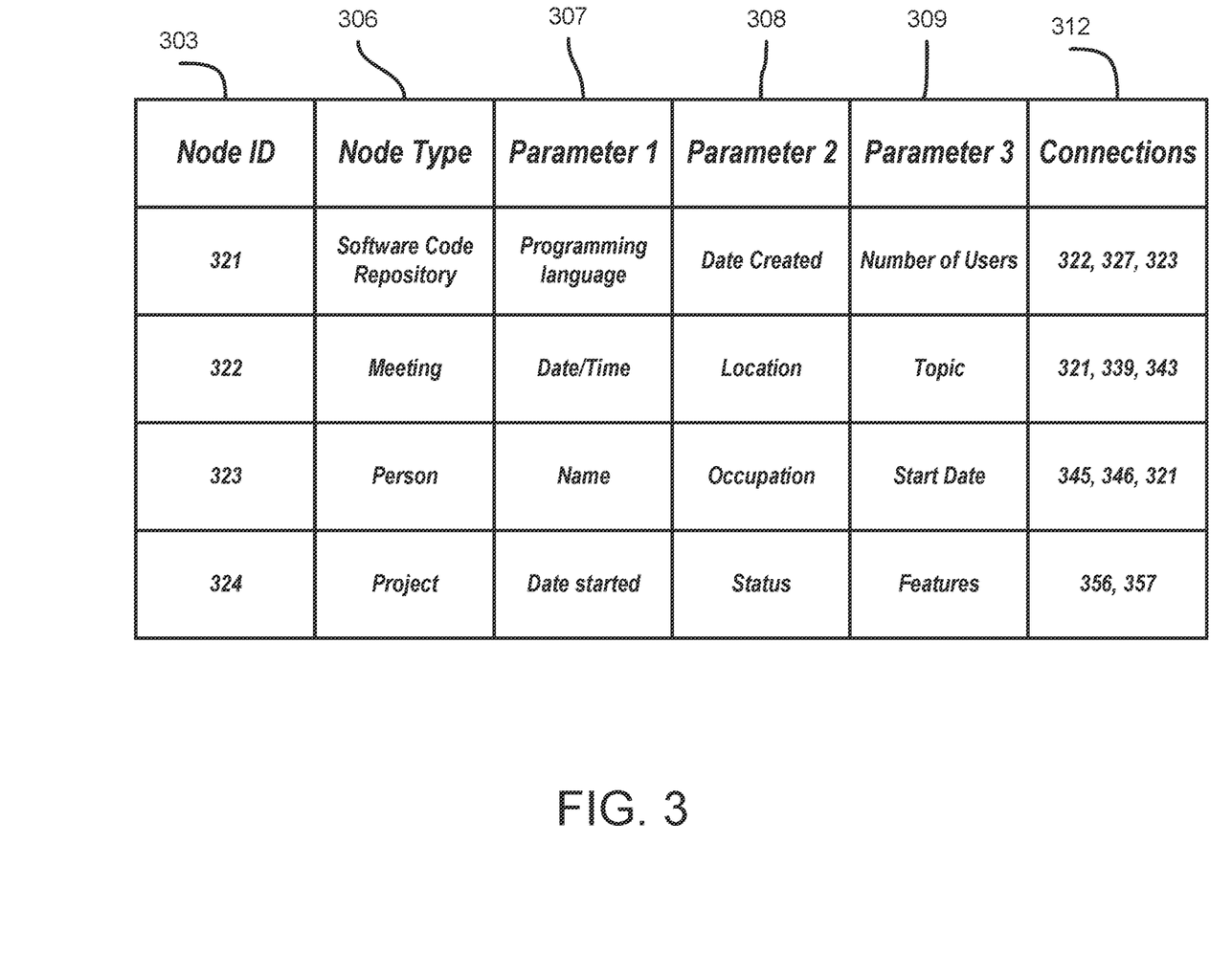
FIG. 3 shows a table with example node types and corresponding example parameters that may be used for locating information sources in response to a query, in accordance with some embodiments.
Figure 4:
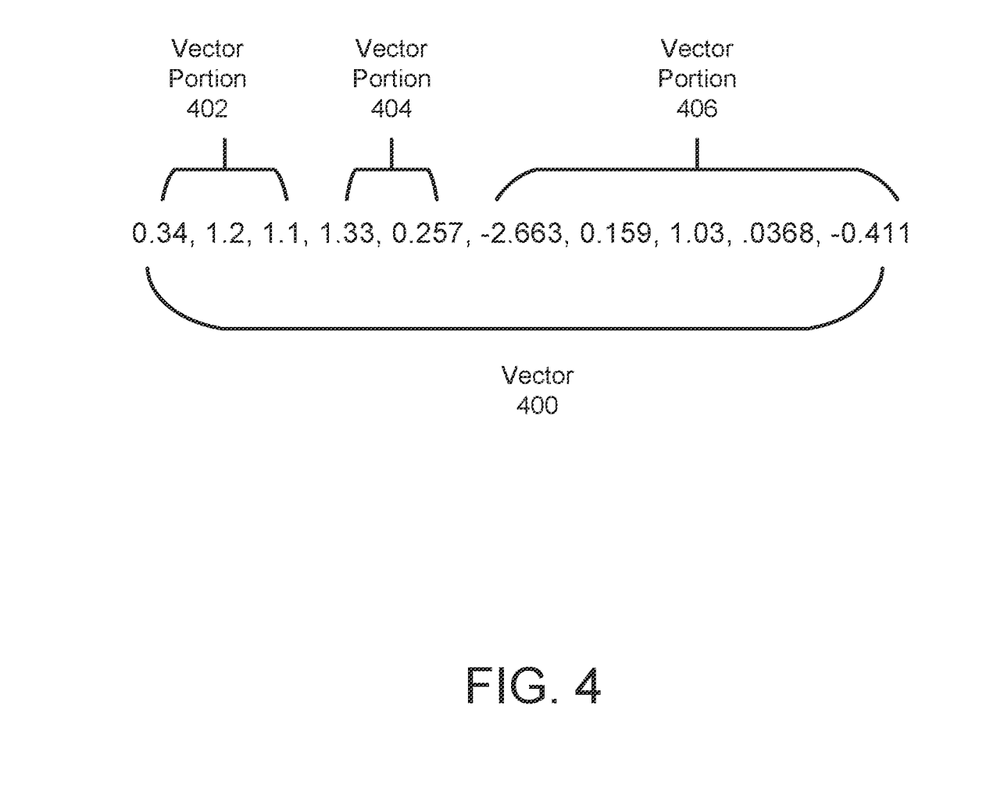
FIG. 4 shows an example vector that may be generated and used for locating information sources in one or more knowledge graphs, in accordance with some embodiments.

Additionally or alternatively, the set of nodes may be limited to one or more types of nodes (node types are explained in more detail below in connection with FIGS. 3-4). For example, the query may indicate that only certain types of nodes should be included in the set of nodes. The graph subsystem 114 may remove, from the set of nodes, any node that does not match a node type indicated by the query.

The vector generation subsystem 116 may retrieve, from the set of nodes, a plurality of node parameters. The plurality of node parameters may include data indicating an entity that each corresponding node represents and/or data indicating a node type of each node. To illustrate the parameters and data that may be retrieved from the set of nodes, FIG. 3 shows a table with example node types and corresponding example parameters. Each node may include a node ID 303, a node type 306, one or more parameters (e.g., parameter 307, parameter 308, parameter 309), and/or a list of node IDs indicating other nodes to which it is connected (e.g., indicating edges between the node and the nodes indicated by the node IDs). For example, node 321 may be a software code repository node that has a parameter indicating a programming language used in the repository (e.g., Java, C++, etc.), a date that the software repository was created, and a number of users of the repository (e.g., the number of users that are allowed to edit the repository). The connections 312 for node 321 may indicate that node 321 is connected to node 322 (e.g., implying that there was a meeting about the software code repository corresponding to node 321), node 327, and node 323 (e.g., implying that the person associated with node 323 has modified the software code repository indicated by the node 321). As an additional example, node 322 may be a meeting node that includes parameters indicating a date/time of the meeting, a location of the meeting, and a topic of the meeting. Node 322 may be connected to nodes 321, node 339, and node 343. As an additional example, node 323 may be a person node that includes parameters indicating a name of the person, an occupation of the person, and start date (e.g., of employment at the organization) of the person. The node 323 may be connected to nodes 345, 346, and 321. As an additional example, the node 324 may be a project node that includes parameters indicating a date on which the project started, a status of the project (e.g., whether the project is complete, whether it has a deployed product, etc.), and features of the project (e.g., functionality of the project, etc.). Node 324 may be connected to node 356 and node 357.

The vector generation subsystem 116 may use the plurality of node parameters retrieved from the set of nodes to generate a vector representation of the set of nodes. The vector representation may be used as input into a machine learning model as discussed in more detail below (e.g., in connection with FIGS. 4-7). FIG. 4 shows an example vector 400 that may be generated (e.g., by the vector generation subsystem 116) using the plurality of node parameters. The vector 400 may include a plurality of vector portions 402, 404, and 406. Each vector portion may correspond to a node, a portion of the parameters of a node, and/or a node type. For example, the vector portion 402 may correspond to a meeting node and may be indicative of any portion of the parameters of a meeting node as explained above in connection with node 322 of FIG. 3. As an additional example, the vector portion 404 may correspond to a person node and may be indicate of any portion of the parameters of a person node as explained above in connection with node 323 of FIG. 3. As an additional example, the vector portion 406 may correspond to a project node and may be indicative of any portion of the parameters of a project node as explained above in connection with node 324 of FIG. 3. The vector generation subsystem 116 may use each vector portion 402-406 to generate the vector 400. For example, the vector generation subsystem 116 may concatenate each vector portion 402-406 to generate the vector 400. Although only three vector portions are shown in FIG. 4, a vector may include any number of vector portions (e.g., the vector generation subsystem 116 may use any number of nodes to generate the vector portions).

The search system 102 may include a machine learning subsystem 118 configured to train one or more machine learning models. A machine learning model may take as input a vector (e.g., the vector 400 as described in connection with FIG. 4 above) and provide a plurality of output parameters. The output parameters may indicate one or more information sources that are responsive to a query received by the search system 102. For example, the output parameters may indicate one or more nodes in the knowledge graph that may indicate information sources responsive to the query. The output parameters may be fed back to the machine learning model as input to train the machine learning model (e.g., alone or in conjunction with user indications of the accuracy of outputs, labels associated with the inputs, or with other reference feedback information). The machine learning model may update its configurations (e.g., weights, biases, or other parameters) based on the assessment of its prediction (e.g., of an information source) and reference feedback information (e.g., user indication of accuracy, reference labels, or other information). Connection weights may be adjusted, for example, if the machine learning model is a neural network, to reconcile differences between the neural network's prediction and the reference feedback. One or more neurons of the neural network may require that their respective errors are sent backward through the neural network to facilitate the update process (e.g., backpropagation of error). Updates to the connection weights may, for example, be reflective of the magnitude of error propagated backward after a forward pass has been completed. In this way, for example, the machine learning model may be trained to generate better predictions of information sources that are responsive to a query.

In some embodiments, the machine learning model may include an artificial neural network. In a variety of embodiments, machine learning model may include an input layer and one or more hidden layers. Each neural unit of the machine learning model may be connected with one or more other neural units of the machine learning model. Such connections can be enforcing or inhibitory in their effect on the activation state of connected neural units. Each individual neural unit may have a summation function which combines the values of all of its inputs together. Each connection (or the neural unit itself) may have a threshold function that a signal must surpass before it propagates to other neural units. The machine learning model may be self-learning and/or trained, rather than explicitly programmed, and may perform significantly better in certain areas of problem solving, as compared to computer programs that do not use machine learning. During training, an output layer of the machine learning model may correspond to a classification of machine learning model and an input known to correspond to that classification may be input into an input layer of machine learning model during training. During testing, an input without a known classification may be input into the input layer, and a determined classification may be output.

A machine learning model trained by the machine learning subsystem 118 may include embedding layers at which each feature of a vector (e.g., the vector 400) is converted into a dense vector representation. These dense vector representations for each feature may be pooled at one or more subsequent layers to convert the set of embedding vectors into a single vector.

The machine learning model may be structured as a factorization machine model. The machine learning model may be a non-linear model and/or supervised learning model that can perform classification and/or regression. For example, the machine learning model may be a general-purpose supervised learning algorithm that the system uses for both classification and regression tasks. Alternatively, the machine learning model may include a Bayesian model configured to perform variational inference on the knowledge graph and/or vector.

The machine learning model may assist with updating the knowledge graph (e.g., the knowledge graph stored in the database 106). The machine learning model may determine entities that should be represented by nodes and connected to other entities. In some embodiments, the entities determined by the machine learning model may not be represented by a system of record of the organization. For example, a new project may not have a corresponding data entity that is stored in a database (e.g., system of record). However, the machine learning model may determine that a node for a new project should be added to the knowledge graph because a plurality of people have been participating in meetings together, developing code, interacting via other communication methods, etc. For example, the machine learning model may implement a clustering technique that outputs nodes (e.g., a discovered project) and edges (e.g., indicating the projects relationships to people, systems, locations, etc, associated with the project) that should be added to the knowledge graph. In some embodiments, the machine learning model may generate probabilities that may be stored as node and/or edge attributes. The probabilities may indicate a level of certainty the system 102 has about the existence of the corresponding node and/or edge and its connections to other nodes/edges. Additionally or alternatively, the machine learning model may be used to determine updates to the knowledge graph. For example, the machine learning model may be used to determine that a node or edge should be removed (e.g., archived) from the knowledge graph. The machine learning model may periodically check for updates (e.g., the machine learning model may run once per day, in batch mode, etc.) that should be made to the knowledge graph. The updates may include changes to nodes, edges, and/or node/edge attributes (e.g., the probabilities described above, timestamps, etc.)

The machine learning model may recommend or construct new relationships (e.g., in an automated fashion). For example, if an employee is onboarded to a new team, the system 102 may determine (e.g., via the machine learning model) based on the employee's activities what project the employee is working on and other employees that are working on the same project. The system 102 may send a message to the to the employee with a list of people that the employee should meet with (e.g., other employees that may be working on the project or otherwise associated with the project). The system 102 may assist the employee to schedule the meetings that are recommended, for example, if the employee approves the meetings. Alternatively, the system 102 may schedule the meetings automatically (e.g., based on scheduling information associated with each employee), for example, if the system 102 has high enough confidence to act without authorization (e.g., probabilities associated with nodes/edges connecting the new employee to other employees are higher than a threshold probability). As additional examples, the system 102 may recommend data sources, learning resources, code repositories, and other resources related to the project the employee is working on. As an additional example, the system 102 may determine (e.g., via the machine learning model) that, based on a production incident recorded in a database (e.g., a human resources system or other database), that one employee should meet with another employee.

The graph subsystem 114 may use the parameters output by the machine learning subsystem 118 to identify one or more nodes in the knowledge graph (e.g., the knowledge graph shown in FIG. 2) that correspond to the plurality of output parameters. The graph subsystem 114 may compare parameters output by the machine learning subsystem 118 with parameters of one or more nodes in the knowledge graph (e.g., by sending a query to the database 106, using a node index, etc.). The graph subsystem 114 may determine a node that matches the output parameters. For example, if more than a threshold number (e.g., 1, 2, 5, 10, etc.) of parameters of a node match the output parameters, the graph subsystem 114 may determine that the node is a match for the output parameters. As an example, the query may indicate that instructions on how to use a particular product is desired. The machine learning model may output parameters that match with a node indicating a document comprising instructions for using the product and a node indicating a person that contributed to a software code repository associated with the product. The nodes indicating the document and the person may be identified by the graph subsystem 114 as matches for the output parameters.

The communication subsystem 112 may send to the client device 104 information associated with the nodes that match the output parameters. For example, the communication subsystem 112 may send the name or other contact information of a person indicated by a matching node and/or the document indicated by a matching node to the client device 104. As an additional example, the communication subsystem 112 may send a document written by a person if the matching node indicates a person that wrote the document. As an additional example, the communication subsystem 112 may send the name of an author of a document if the matching node indicates the document. As an additional example, if the matching node is a meeting node, the communication subsystem 112 may send an identification of people that attended the meeting indicated by the meeting node. As an additional example, if the matching node indicates a person, the communication subsystem 112 may send information indicating a software code repository that the person interacted with. As an additional example, if the matching node indicates a product, the communication subsystem 112 may send information comprising an identification of a team responsible for creating the product and/or an identification of a software code repository associated with the product.

Figure 5:
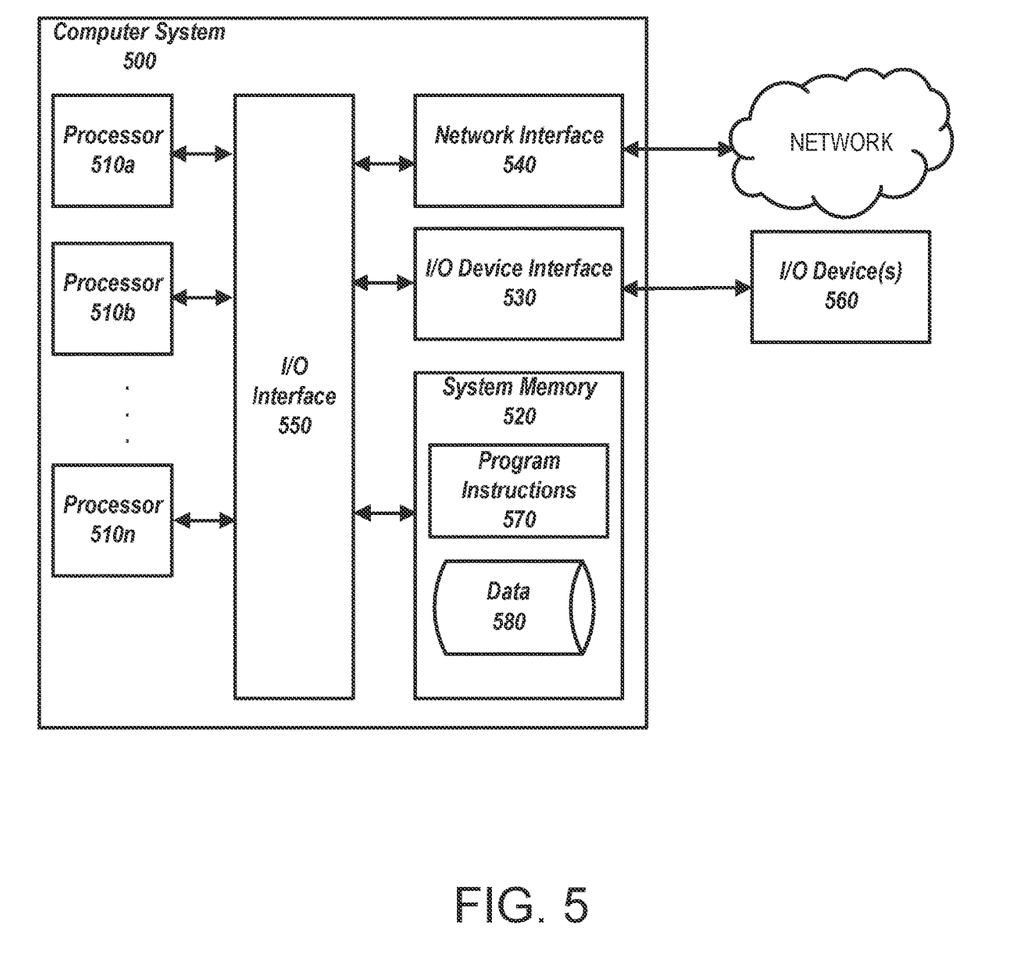
FIG. 5 shows an example computing system that may be used to perform searches on one or more knowledge graphs, in accordance with some embodiments.

FIG. 5 is a diagram that illustrates an exemplary computing system 500 in accordance with embodiments of the present technique. Various portions of systems and methods described herein, may include or be executed on one or more computer systems similar to computing system 500. Further, processes and modules described herein may be executed by one or more processing systems similar to that of computing system 500.

Computing system 500 may include one or more processors (e.g., processors 510a-510n) coupled to system memory 520, an input/output I/O device interface 530, and a network interface 540 via an input/output (I/O) interface 550. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 500. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 520). Computing system 500 may be a units-processor system including one processor (e.g., processor 510a), or a multi-processor system including any number of suitable processors (e.g., 510a-510n). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry. e.g., an FPGA (field programmable gate array) or an ASIC (application specific integrated circuit). Computing system 500 may include a plurality of computing devices (e.g., distributed computer systems) to implement various processing functions.

I/O device interface 530 may provide an interface for connection of one or more I/O devices 560 to computer system 500. I/O devices may include devices that receive input (e.g., from a user) or output information (e.g., to a user). I/O devices 560 may include, for example, graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. VO devices 560 may be connected to computer system 500 through a wired or wireless connection. I/O devices 560 may be connected to computer system 500 from a remote location. I/O devices 560 located on remote computer system, for example, may be connected to computer system 500 via a network and network interface 540.

Network interface 540 may include a network adapter that provides for connection of computer system 500 to a network. Network interface may 540 may facilitate data exchange between computer system 500 and other devices connected to the network. Network interface 540 may support wired or wireless communication. The network may include an electronic communication network, such as the Internet, a local area network (LAN), a wide area network (WAN), a cellular communications network, or the like.

System memory 520 may be configured to store program instructions 570 or data 580. Program instructions 570 may be executable by a processor (e.g., one or more of processors 510a-510n) to implement one or more embodiments of the present techniques. Instructions 570 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 520 may include a tangible program carrier having program instructions stored thereon. A tangible program carrier may include a non-transitory computer readable storage medium. A non-transitory computer readable storage medium may include a machine readable storage device, a machine readable storage substrate, a memory device, or any combination thereof. Non-transitory computer readable storage medium may include non-volatile memory (e.g., flash memory, ROM. PROM. EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard-drives), or the like. System memory 520 may include a non-transitory computer readable storage medium that may have program instructions stored thereon that are executable by a computer processor (e.g., one or more of processors 510a-510n) to cause the subject matter and the functional operations described herein. A memory (e.g., system memory 520) may include a single memory device and/or a plurality of memory devices (e.g., distributed memory devices).

I/O interface 550 may be configured to coordinate I/O traffic between processors 510a-510n, system memory 520, network interface 540, I/O devices 560, and/or other peripheral devices. I/O interface 550 may perform protocol, timing, or other data transformations to convert data signals from one component (e.g., system memory 520) into a format suitable for use by another component (e.g., processors 510a-510n). 110 interface 550 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 500 or multiple computer systems 500 configured to host different portions or instances of embodiments. Multiple computer systems 500 may provide for parallel or sequential processing/execution of one or more portions of the techniques described herein.

Those skilled in the art will appreciate that computer system 500 is merely illustrative and is not intended to limit the scope of the techniques described herein. Computer system 500 may include any combination of devices or software that may perform or otherwise provide for the performance of the techniques described herein. For example, computer system 500 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, or a Global Positioning System (GPS), or the like. Computer system 500 may also be connected to other devices that are not illustrated and/or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

Those skilled in the art will also appreciate that while various items are illustrated as being stored in memory or on storage while being used, these items or portions of them may be transferred between memory and other storage devices for purposes of memory management and data integrity. Alternatively, in a variety of embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 500 may be transmitted to computer system 500 via transmission media or signals such as electrical, electromagnetic, or digital signals, conveyed via a communication medium such as a network or a wireless link. Various embodiments may further include receiving, sending, or storing instructions or data implemented in accordance with the foregoing description upon a computer-accessible medium. Accordingly, the present disclosure may be practiced with other computer system configurations.

Figure 6:
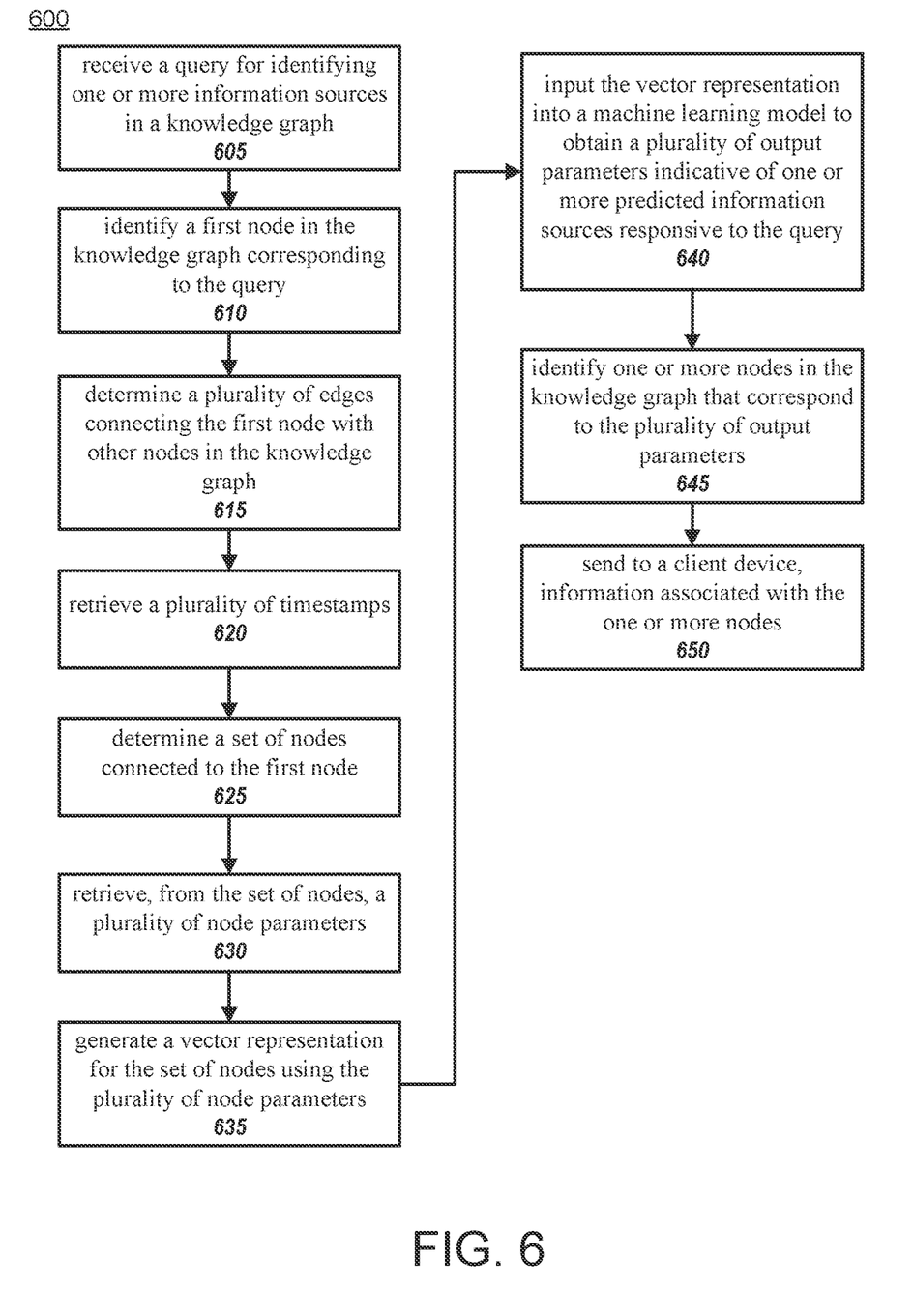
FIG. 6 shows an example flowchart of the actions involved in using machine learning to locate information sources in response to a query, in accordance with some embodiments.

FIG. 6 shows a flowchart of the actions involved in using machine learning to locate information sources in response to a query. For example, process 600 may represent the actions taken by one or more devices shown in FIGS. 1-5 and described above. At action 605, process 600 (e.g., using one or more components in system 100 (FIG. 1) and/or computing system 500 (FIG. 5)) receives a query for identifying one or more information sources in a knowledge graph. The knowledge graph may include a plurality of nodes connected by a plurality of edges (e.g., as described in connection with FIGS. 1-3 above). Each edge of the plurality of edges may be associated with a timestamp (e.g., as described above in connection with FIGS. 1-3 above).

At action 610, process 600 (e.g., using one or more components in system 100 (FIG. 1) and/or computing system 500 (FIG. 5)) identifies a first node in the knowledge graph corresponding to the query. At action 615, process 600 (e.g., using one or more components in system 100 (FIG. 2)

and/or computing system 500 (FIG. 5)) determines a plurality of edges connecting the first node with other nodes in the knowledge graph.

At action 620, process 600 (e.g., using one or more components in system 100 (FIG. 1) and/or computing system 500 (FIG. 5)) retrieves a plurality of timestamps. Each timestamp of the plurality of timestamps may be associated with an edge of the plurality of edges. Each timestamp may represent an interaction time between an entity represented by the first node and an entity corresponding to a node connected with the first node via a corresponding edge.

At action 625, process 600 (e.g., using one or more components in system 100 (FIG. 1) and/or computing system 500 (FIG. 5)) determines a set of nodes connected to the first node. Each node in the set of nodes may be connected to the first node via an edge. The edge may be associated with a timestamp that satisfies a threshold time. Edges associated with timestamps that do not satisfy the threshold time may be excluded from the set of nodes.

At action 630, process 600 (e.g., using one or more components in system 100 (FIG. 1) and/or computing system 500 (FIG. 5)) retrieves, from the set of nodes, a plurality of node parameters. The plurality of node parameters may comprise data that indicates an entity that each corresponding node represents.

At action 635, process 600 (e.g., using one or more components in system 100 (FIG. 1) and/or computing system 500 (FIG. 5)) generates a vector representation of the set of nodes using the plurality of node parameters. At action 640, process 60) (e.g., using one or more components in system 100 (FIG. 1) and/or computing system 500 (FIG. 5)) inputs the vector representation into a machine learning model to obtain a plurality of output parameters indicative of one or more predicted information sources responsive to the query.

At action 645, process 600 (e.g., using one or more components in system 100 (FIG. 1) and/or computing system 500 (FIG. 5)) identifies one or more nodes in the knowledge graph that correspond to the plurality of output parameters. At action 650, process 600 (e.g., using one or more components in system 100 (FIG. 1) and/or computing system 500 (FIG. 5)) sends to a client device, information associated with the one or more nodes.

It is contemplated that the actions or descriptions of FIG. 6 may be used with any other embodiment of this disclosure. In addition, the actions and descriptions described in relation to FIG. 6 may be done in alternative orders or in parallel to further the purposes of this disclosure. For example, each of these actions may be performed in any order, in parallel, or simultaneously to reduce lag or increase the speed of the system or method. Furthermore, it should be noted that any of the devices or equipment discussed in relation to FIGS. 1-5 could be used to perform one or more of the actions in FIG. 6.

Figure 7:
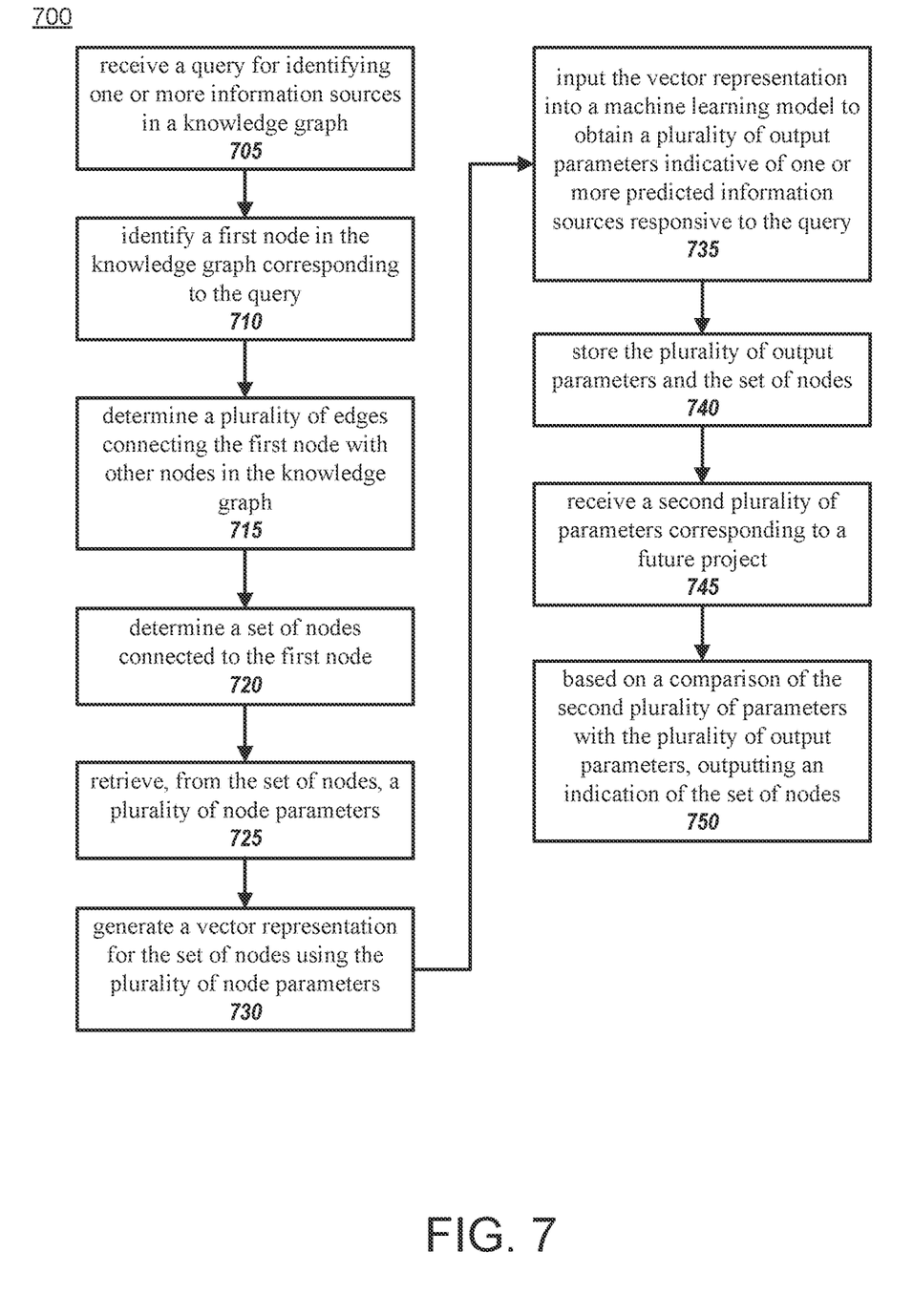
FIG. 7 shows an example flowchart of the actions involved in using machine learning to recommend entities for future projects, in accordance with some embodiments.

FIG. 7 shows a flowchart of the actions involved in using machine learning to locate information sources in response to a query. For example, process 700 may represent the actions taken by one or more devices shown in FIGS. 1-5 and described above.

At action 705, process 700 (e.g., using one or more components in system 100 (FIG. 1) and/or computing system 500 (FIG. 5)) receives a query for identifying one or more information sources in a knowledge graph. The knowledge graph may include a plurality of nodes connected by a plurality of edges.

At action 710, process 700 (e.g., using one or more components in system 100 (FIG. 1) and/or computing system 500 (FIG. 5)) identifies a first node in the knowledge graph corresponding to the query. At action 715, process 700 (e.g., using one or more components in system 100 (FIG. 1) and/or computing system 500 (FIG. 5)) determines a plurality of edges connecting the first node with other nodes in the knowledge graph. At action 720, process 700 (e.g., using one or more components in system 100 (FIG. 1) and/or computing system 500 (FIG. 5)) determines a set of nodes connected to the first node.

At action 725, process 700 (e.g., using one or more components in system 100 (FIG. 1) and/or computing system 500 (FIG. 5)) retrieves, from the set of nodes, a plurality of node parameters. The plurality of node parameters may include data that indicates an entity that each corresponding node represents.

At action 730, process 700 (e.g., using one or more components in system 100 (FIG. 1) and/or computing system 500 (FIG. 5)) generates a vector representation for the set of nodes using the plurality of node parameters. At action 735, process 700 (e.g., using one or more components in system 100 (FIG. 1) and/or computing system 500 (FIG. 5)) inputs the vector representation into a machine learning model to obtain a plurality of output parameters indicative of one or more predicted information sources responsive to the query.

At action 740, process 700 (e.g., using one or more components in system 100 (FIG. 1) and/or computing system 500 (FIG. 5)) stores the plurality of output parameters and the set of nodes. At action 745, process 700 (e.g., using one or more components in system 100 (FIG. 1) and/or computing system 500 (FIG. 5)) receives a second plurality of parameters corresponding to a future project.

At action 750, process 700 (e.g., using one or more components in system 100 (FIG. 1) and/or computing system 500 (FIG. 5)) outputs an indication of the set of nodes. The outputting may be based on a comparison of the second plurality of parameters with the plurality of output parameters. The set of nodes may indicate knowledge graph entities that the search system 102 recommends participating in the future project. Additionally or alternatively, the set of nodes may indicate software features to include in the future project. For example, the set of nodes may indicate that chat functionality, computer vision functionality for identifying objects in images, natural language processing functionality for typing assistance, or any other functionality should be added to an application.

It is contemplated that the actions or descriptions of FIG. 7 may be used with any other embodiment of this disclosure. In addition, the actions and descriptions described in relation to FIG. 7 may be done in alternative orders or in parallel to further the purposes of this disclosure. For example, each of these actions may be performed in any order, in parallel, or simultaneously to reduce lag or increase the speed of the system or method. Furthermore, it should be noted that any of the devices or equipment discussed in relation to FIGS. 1-5 could be used to perform one or more of the actions in FIG. 7.

In block diagrams, illustrated components are depicted as discrete functional blocks, but embodiments are not limited to systems in which the functionality described herein is organized as illustrated. The functionality provided by each of the components may be provided by software or hardware modules that are differently organized than is presently depicted, for example such software or hardware may be intermingled, conjoined, replicated, broken up, distributed (e.g., within a data center or geographically), or otherwise differently organized. The functionality described herein may be provided by one or more processors of one or more computers executing code stored on a tangible, non-transitory, machine readable medium. In some cases, third party content delivery networks may host some or all of the information conveyed over networks, in which case, to the extent information (e.g., content) is said to be supplied or otherwise provided, the information may be provided by sending instructions to retrieve that information from a content delivery network.

The reader should appreciate that the present application describes several disclosures. Rather than separating those disclosures into multiple isolated patent applications, applicants have grouped these disclosures into a single document because their related subject matter lends itself to economies in the application process. But the distinct advantages and aspects of such disclosures should not be conflated. In some cases, embodiments address all of the deficiencies noted herein, but it should be understood that the disclosures are independently useful, and some embodiments address only a subset of such problems or offer other, unmentioned benefits that will be apparent to those of skill in the art reviewing the present disclosure. Due to costs constraints, some features disclosed herein may not be presently claimed and may be claimed in later filings, such as continuation applications or by amending the present claims. Similarly, due to space constraints, neither the Abstract nor the Summary sections of the present document should be taken as containing a comprehensive listing of all such disclosures or all aspects of such disclosures.

It should be understood that the description and the drawings are not intended to limit the disclosure to the particular form disclosed, but to the contrary, the intention is to cover all modifications, equivalents, and alternatives falling within the spirit and scope of the present disclosure as defined by the appended claims. Further modifications and alternative embodiments of various aspects of the disclosure will be apparent to those skilled in the art in view of this description. Accordingly, this description and the drawings are to be construed as illustrative only and are for the purpose of teaching those skilled in the art the general manner of carrying out the disclosure. It is to be understood that the forms of the disclosure shown and described herein are to be taken as examples of embodiments. Elements and materials may be substituted for those illustrated and described herein, parts and processes may be reversed or omitted, and certain features of the disclosure may be utilized independently, all as would be apparent to one skilled in the art after having the benefit of this description of the disclosure. Changes may be made in the elements described herein without departing from the spirit and scope of the disclosure as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an." and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X. Y.". "if X, Y," "when X. Y." and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents. e.g., the antecedent is relevant to the likelihood of the consequent occurring. Statements in which a plurality of attributes or functions are mapped to a plurality of objects (e.g., one or more processors performing actions A, B, C, and D) encompasses both all such attributes or functions being mapped to all such objects and subsets of the attributes or functions being mapped to subsets of the attributes or functions (e.g., both all processors each performing actions A-D, and a case in which processor 1 performs action A, processor 2 performs action B and part of action C, and processor 3 performs part of action C and action D), unless otherwise indicated. Further, unless otherwise indicated, statements that one value or action is "based on" another condition or value encompass both instances in which the condition or value is the sole factor and instances in which the condition or value is one factor among a plurality of factors. The term "each" is not limited to "each and every" unless indicated otherwise. Unless specifically stated otherwise, as apparent from the discussion, it is appreciated that throughout this specification discussions utilizing terms such as "processing." "computing." "calculating." "determining" or the like refer to actions or processes of a specific apparatus, such as a special purpose computer or a similar special purpose electronic processing/computing device.

The above-described embodiments of the present disclosure are presented for purposes of illustration and not of limitation, and the present disclosure is limited only by the claims which follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods. Accordingly, the scope of the invention should be determined not by the embodiments illustrated, but by the appended claims and their equivalents.

The present techniques will be better understood with reference to the following enumerated embodiments:

1. A method, the method comprising: receiving a query for one or more information sources in a graph; identifying a first node in the graph; determining a plurality of edges connecting the first node with other nodes in the graph; determining a set of nodes connected to the first node; retrieving from the set of nodes, a plurality of node parameters; generating a vector representation for the set of nodes; inputting the vector representation into a machine learning model to obtain output parameters; identifying one or more nodes corresponding to the output parameters; and sending, to a client device, information associated with the one or more nodes.

2. A method, the method comprising: receiving a query for identifying one or more information sources in a graph;

identifying a first node in the graph corresponding to the query; determining a plurality of edges connecting the first node with other nodes in the graph; determining a set of nodes connected to the first node; retrieving, from the set of nodes, a plurality of node parameters; generating a vector representation for the set of nodes using the plurality of node parameters; inputting the vector representation into a machine learning model to obtain a plurality of output parameters; storing the plurality of output parameters and the set of nodes; receiving a second plurality of parameters corresponding to a future project; and based on a comparison of the second plurality of parameters with the plurality of output parameters, outputting an indication of the set of nodes.

3. The method of any of the preceding embodiments, wherein identifying one or more nodes in the graph that correspond to the plurality of output parameters comprises: accessing a node index associated with the graph; comparing the plurality of output parameters with parameters associated with nodes within the node index; and identifying, based on the comparing, the one or more nodes.

4. The method of any of the preceding embodiments, further comprising: determining, based on the query, one or more types of nodes that are responsive to the query; and removing, from the set of nodes, a second node that does not match the one or more types of nodes.

5. The method of any of the preceding embodiments, wherein the one or more nodes in the graph: comprises a node representing a first person and the information associated with the one or more nodes indicates a document written by the first person; comprises a node representing a document and the information associated with the one or more nodes indicates one or more authors of the document; comprises a node representing a meeting, and the information associated with the one or more nodes identifies people who attended the meeting; and comprises a node representing a second person, and the information associated with the one or more nodes identifies a software code repository that the second person interacted with.

6. The method of any of the preceding embodiments, wherein the one or more nodes in the graph indicates a product, and the information associated with the one or more nodes identifies a team responsible for creating the product and a software code repository associated with the product.

7. The method of any of the preceding embodiments, wherein the generating the vector representation for the set of nodes using the plurality of node parameters comprises: generating, based on a first parameter of the plurality of node parameters, a first portion of the vector and based on a second parameter of the plurality of node parameters, a second portion of the vector, wherein the first parameter and second parameter correspond to different node types of the set of nodes; and concatenating the first portion and the second portion.

8. The method of any of the preceding embodiments, further comprising: storing the plurality of output parameters and the set of nodes; receiving a second plurality of parameters corresponding to a future project; and based on a comparison of the second plurality of parameters with the plurality of output parameters, outputting an indication of the set of nodes, wherein the set of nodes indicates entities recommended for the future project, or software features to include in the future project 9. A tangible, non-transitory, machine-readable medium storing instructions that, when executed by a data processing apparatus, cause the data processing apparatus to perform operations comprising those of any of embodiments 1-8.

10. A system comprising: one or more processors; and memory storing instructions that, when executed by the processors, cause the processors to effectuate operations comprising those of any of embodiments 1-8.

11. A system comprising means for performing any of embodiments 1-8.

What is claimed is:

1. A system for locating information sources in response to a query, the system comprising:
   one or more processors configured to execute computer program instructions that, when executed, cause operations comprising:
      receiving a query for identifying one or more information sources in a knowledge graph, wherein the knowledge graph comprises a plurality of nodes connected by a plurality of edges, and wherein each edge of the plurality of edges is associated with a timestamp;
      identifying a first node in the knowledge graph corresponding to the query;
      determining a plurality of edges connecting the first node with other nodes in the knowledge graph;
      retrieving a plurality of timestamps, wherein each timestamp of the plurality of timestamps is associated with an edge of the plurality of edges, each timestamp representing an interaction time between an entity represented by the first node and an entity corresponding to a node connected with the first node via a corresponding edge;
      determining a set of nodes connected to the first node, wherein each node in the set of nodes connects to the first node via an edge with an associated timestamp of the plurality of timestamps that satisfies a threshold time;
      retrieving, from the set of nodes, a plurality of node parameters, wherein the plurality of node parameters comprises data that indicates an entity that each corresponding node represents;
      generating a vector representation for the set of nodes using the plurality of node parameters;
      inputting the vector representation into a machine learning model to obtain a plurality of output parameters indicative of one or more predicted information sources responsive to the query;
      identifying one or more nodes in the knowledge graph that correspond to the plurality of output parameters; and
      sending to a client device, information associated with the one or more nodes, wherein the one or more nodes in the knowledge graph:
         comprise a node representing a first person and the information associated with the one or more nodes indicates a document written by the first person;
         comprise a node representing a document and the information associated with the one or more nodes indicates one or more authors of the document;
         comprise a node representing a meeting, and the information associated with the one or more nodes identifies people who attended the meeting; and
         comprise a node representing a second person, and the information associated with the one or more nodes identifies a software code repository that the second person interacted with.

2. The system of claim 1, wherein identifying one or more nodes in the knowledge graph that correspond to the plurality of output parameters comprises:

accessing a node index associated with the knowledge graph;
comparing the plurality of output parameters with parameters associated with nodes within the node index; and
identifying, based on the comparing, the one or more nodes.

3. The system of claim 1, wherein the computer program instructions, when executed, cause operations further comprising:
determining, based on the query, one or more types of nodes that are responsive to the query; and
removing, from the set of nodes, a second node that does not match the one or more types of nodes.

4. The system of claim 1, wherein the one or more nodes in the knowledge graph indicates a product, and the information associated with the one or more nodes identifies a team responsible for creating the product and a software code repository associated with the product.

5. The system of claim 1, wherein the generating the vector representation for the set of nodes using the plurality of node parameters comprises:
generating, based on a first parameter of the plurality of node parameters, a first portion of the vector and based on a second parameter of the plurality of node parameters, a second portion of the vector, wherein the first parameter and second parameter correspond to different node types of the set of nodes; and
concatenating the first portion and the second portion.

6. The system of claim 1, wherein the computer program instructions, when executed, cause operations further comprising:
storing the plurality of output parameters and the set of nodes;
receiving a second plurality of parameters corresponding to a future project; and
based on a comparison of the second plurality of parameters with the plurality of output parameters, outputting an indication of the set of nodes, wherein the set of nodes indicates entities recommended for the future project, or software features to include in the future project.

7. A non-transitory, computer-readable medium storing instructions that, when executed by one or more processors, cause the one or more processors to perform operations comprising:
receiving a query for identifying one or more information sources in a knowledge graph, wherein the knowledge graph comprises a plurality of nodes connected by a plurality of edges, wherein the plurality of nodes in the knowledge graph:
comprise a node representing a first person and information associated with the plurality of nodes indicates a document written by the first person;
comprise a node representing a document and information associated with the plurality of nodes indicates one or more authors of the document;
comprise a node representing a meeting, and information associated with the plurality of nodes identifies people who attended the meeting; and
comprise a node representing a second person, and information associated with the plurality of nodes identifies a software code repository that the second person interacted with;
identifying a first node in the knowledge graph corresponding to the query;
determining a plurality of edges connecting the first node with other nodes in the knowledge graph;
determining a set of nodes connected to the first node;
retrieving, from the set of nodes, a plurality of node parameters, wherein the plurality of node parameters comprises data that indicates an entity that each corresponding node represents;
generating a vector representation for the set of nodes using the plurality of node parameters;
inputting the vector representation into a machine learning model to obtain a plurality of output parameters indicative of one or more predicted information sources responsive to the query;
storing the plurality of output parameters and the set of nodes;
receiving a second plurality of parameters corresponding to a future project; and
based on a comparison of the second plurality of parameters with the plurality of output parameters, outputting an indication of the set of nodes, wherein the set of nodes indicate knowledge graph entities recommended to participate in the future project, or software features to include in the future project.

8. The non-transitory, computer-readable medium of claim 7, wherein the instructions, when executed by one or more processors, further cause the one or more processors to perform operations comprising:
retrieving a plurality of timestamps, wherein each timestamp of the plurality of timestamps is associated with an edge of the plurality of edges, each timestamp representing an interaction time between an entity represented by the first node and an entity corresponding to a node connected with the first node via a corresponding edge.

9. The non-transitory, computer-readable medium of claim 8, wherein each node in the set of nodes connects to the first node via an edge with an associated timestamp of the plurality of timestamps, and wherein each associated timestamp satisfies a threshold time.

10. The non-transitory, computer-readable medium of claim 7, wherein the instructions, when executed, cause operations further comprising:
determining, based on the query, one or more types of nodes that are responsive to the query; and
removing, from the set of nodes, a second node that does not match the one or more types of nodes.

11. The non-transitory, computer-readable medium of claim 7, wherein the plurality of nodes in the knowledge graph indicates a product, and the information associated with the plurality of nodes identifies a team responsible for creating the product and a software code repository associated with the product.

12. The non-transitory, computer-readable medium of claim 7, wherein generating the vector representation for the set of nodes using the plurality of node parameters comprises:
generating, based on a first parameter of the plurality of node parameters, a first portion of the vector representation;
generating, based on a second parameter of the plurality of node parameters, a second portion of the vector representation, wherein the first parameter and second parameter correspond to different node types of the set of nodes; and
concatenating the first portion and the second portion.

13. A method comprising:
receiving, by a computing device, a query for identifying one or more information sources in a knowledge graph, wherein the knowledge graph comprises a plurality of nodes connected by a plurality of edges, wherein the plurality of nodes in the knowledge graph:
- comprise a node representing a first person and information associated with the plurality of nodes indicates a document written by the first person;
- comprise a node representing a document and information associated with the plurality of nodes indicates one or more authors of the document;
- comprise a node representing a meeting, and information associated with the plurality of nodes identifies people who attended the meeting; and
- comprise a node representing a second person, and information associated with the plurality of nodes identifies a software code repository that the second person interacted with;

identifying a first node in the knowledge graph corresponding to the query;

determining a plurality of edges connecting the first node with other nodes in the knowledge graph;

determining a set of nodes connected to the first node;

retrieving, from the set of nodes, a plurality of node parameters, wherein the plurality of node parameters comprises data that indicates an entity that each corresponding node represents;

generating a vector representation for the set of nodes using the plurality of node parameters;

inputting the vector representation into a machine learning model to obtain a plurality of output parameters indicative of one or more predicted information sources responsive to the query;

storing the plurality of output parameters and the set of nodes;

receiving a second plurality of parameters corresponding to a future project; and based on a comparison of the second plurality of parameters with the plurality of output parameters, outputting an indication of knowledge graph entities recommended to participate in the future project, or software features to include in the future project.

14. The method of claim 13, further comprising:
retrieving a plurality of timestamps, wherein each timestamp of the plurality of timestamps is associated with an edge of the plurality of edges, each timestamp representing an interaction time between an entity represented by the first node and an entity corresponding to a node connected with the first node via a corresponding edge.

15. The method of claim 14, wherein each node in the set of nodes connects to the first node via an edge with an associated timestamp, of the plurality of timestamps, that satisfies a threshold time.

16. The method of claim 13, wherein the plurality of nodes in the knowledge graph indicates a product, and the information associated with the plurality of nodes identifies a team responsible for creating the product and a software code repository associated with the product.

17. The method of claim 13, wherein generating the vector representation for the set of nodes using the plurality of node parameters comprises:
- generating, based on a first parameter of the plurality of node parameters, a first portion of the vector representation;
- generating, based on a second parameter of the plurality of node parameters, a second portion of the vector representation, wherein the first parameter and second parameter correspond to different node types of the set of nodes; and
- concatenating the first portion and the second portion.

18. The method of claim 13, further comprising:
- determining, based on the query, one or more types of nodes that are responsive to the query; and
- removing, from the set of nodes, a second node that does not match the one or more types of nodes.

\* \* \* \* \*